US007991011B2

(12) United States Patent
Morris et al.

(10) Patent No.: US 7,991,011 B2
(45) Date of Patent: Aug. 2, 2011

(54) IDENTIFICATION OF CHANGES IN BROADCAST DATABASE

(75) Inventors: Octavius John Morris, Redhill (GB); Alexis Stephen Richard Ashley, Redhill (GB); Ronald Marcel Tol, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1047 days.

(21) Appl. No.: 10/507,810

(22) PCT Filed: Feb. 7, 2003

(86) PCT No.: PCT/IB03/00525

§ 371 (c)(1), (2), (4) Date: Sep. 14, 2004

(87) PCT Pub. No.: WO03/079589

PCT Pub. Date: Sep. 25, 2003

(65) Prior Publication Data

US 2005/0117607 A1 Jun. 2, 2005

(30) Foreign Application Priority Data

Mar. 18, 2002 (GB) .................................. 0206258.6
Sep. 13, 2002 (GB) .................................. 0221273.6

(51) Int. Cl.
*H04J 3/00* (2006.01)

(52) U.S. Cl. ...................................................... 370/476

(58) Field of Classification Search ........................ None
See application file for complete search history.

(56) References Cited

U.S. PATENT DOCUMENTS

| | | | |
|---|---|---|---|
| 5,440,545 A | 8/1995 | Buchholz et al. | |
| 5,559,949 A | 9/1996 | Reimer et al. | |
| 5,619,249 A | 4/1997 | Billock et al. | |
| 5,893,117 A * | 4/1999 | Wang | 1/1 |
| 6,075,527 A | 6/2000 | Ichihashi et al. | |
| 6,446,092 B1 * | 9/2002 | Sutter | 707/203 |
| 6,904,138 B1 * | 6/2005 | Loebig | 379/201.03 |
| 7,047,281 B1 * | 5/2006 | Kausik | 709/213 |
| 7,155,735 B1 * | 12/2006 | Ngo et al. | 725/101 |

FOREIGN PATENT DOCUMENTS

| | | |
|---|---|---|
| FR | 2793910 | 11/2000 |
| WO | 9309631 | 5/1993 |
| WO | 0172042 | 9/2001 |

* cited by examiner

*Primary Examiner* — Raj K Jain

(57) ABSTRACT

A method of acquiring repetitively broadcast data comprises acquiring the data in fragments, acquiring a document comprising information on the fragments, examining the information, and re-acquiring the fragments according to the information.

7 Claims, 2 Drawing Sheets

IDENTIFICATION OF CHANGES IN BROADCAST DATABASE

This invention relates to a method for easily identifying changes in a repetitively broadcast database.

In systems that broadcast audio/visual content to end users, it is common to broadcast data and/or metadata along with the audio/visual content. To implement TV Anytime systems for metadata for programme description, it is necessary to broadcast a database of information that describes the programmes. In order that receiving equipment can acquire the database when it tunes to a channel at an arbitrary time, it is necessary to rebroadcast the data repetitively in a carousel. The database is potentially very large, and the carousel periods may be very long.

MPEG-7 has defined a specification (BiM) for binarising XML data files and sending updates. This does not address the issues raised by repetitive broadcasting. MPEG-2 DSM cc Object Carousel, has been adopted by DVB for sending file system data in a broadcast in a format for repetitive rebroadcast. Object Carousel is a core part of this proposal, which builds a higher-layer protocol on top of Object Carousel.

A receiver that is acquiring a database does not wish to be listening to the broadcast database and continually acquiring it. It is probable that after a period of time either it will have no need for the current data, or it will have cached it locally (possibly on a disc). It is desirable for such receivers to be able to listen to the repetitive broadcast and to find out when an item of the data has changed and where the change is described with very little processing effort.

It is an object of the invention to overcome the problems in the prior art.

According to a first aspect of the invention, there is provided a method of acquiring repetitively broadcast data comprising acquiring said data in fragments, acquiring a document comprising information on said fragments, examining said information, and re-acquiring said fragments according to said information.

According to a second aspect of the invention, there is provided apparatus for acquiring repetitively broadcast data comprising receiving means for acquiring said data in fragments and for acquiring a document comprising information on said fragments, and processing means for examining said information, said receiving means re-acquiring said fragments according to said information.

According to a third aspect of the invention, there is provided a method of repetitively broadcasting data comprising broadcasting said data in fragments, and broadcasting a document comprising information on said fragments.

According to a fourth aspect of the invention, there is provided apparatus for repetitively broadcasting data comprising transmitting means for broadcasting said data in fragments, and for broadcasting a document comprising information on said fragments.

Owing to the invention, it is possible to more efficiently acquire broadcast data.

Advantageously, the document includes a time-stamp for each fragment of data, each time-stamp indicating when the respective fragment was last updated. Preferably, the document also includes a time-stamp indicating when the document itself was last updated. Ideally, a signal that triggers the re-acquiring of the fragments of data is sent to the receiving apparatus.

Embodiments of the invention will now be described, by way of example only, with reference to the accompanying drawings, in which.

Figure 1:
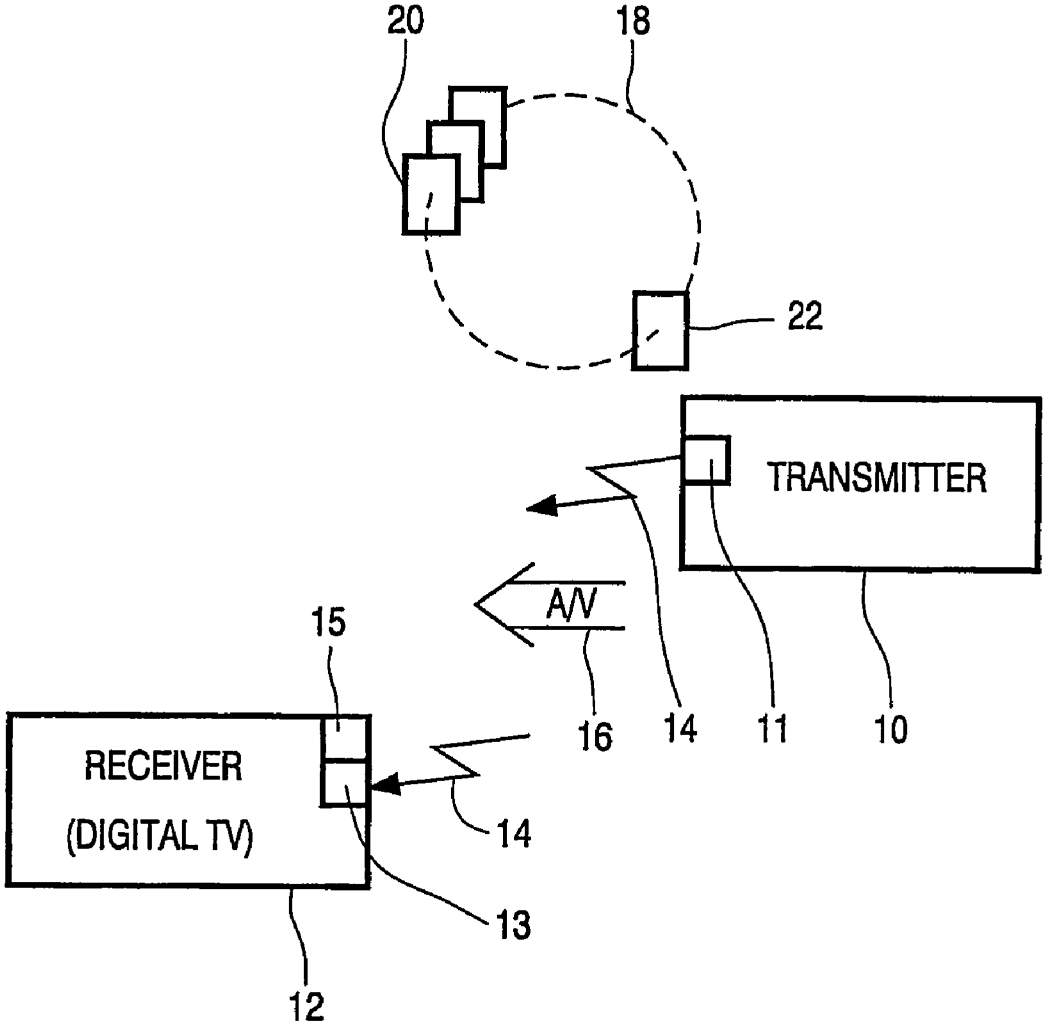
FIG. 1 is a schematic diagram of a broadcast system.

In the broadcast system of FIG. 1, a transmitter 10 broadcasts a signal 14 to a receiver 12, which is a digital television. The signal 14 comprises audio/visual content 16 and a data carousel 18. The data carousel 18 comprises data fragments 20 and a top-level document 22.

The transmitter 10 repetitively broadcasts the data 18 and comprises transmitting means 11 for broadcasting the data in fragments, and for broadcasting the document 22 which comprising information on the fragments 20. The receiver 12 comprises receiving means 13 for acquiring the data 20 in fragments and for acquiring the document 22, which comprises information on the data fragments 20. The receiver 12 also includes processing means 15 for examining the information in the document 22 and the receiving means 13 re-acquires the data fragments 20 according to the information in the document 22.

The broadcast database is split into well-defined fragments 20. Each fragment 20 represents a piece of information that it makes sense to update as a single unit. At the top-level, a "top-level" document 22 is defined that describes where to find each fragment 20 (e.g. filename) and its relationship to other fragments. In the top-level document 22 there is provided a time-stamp that indicates when each fragment 20 was last updated. This top-level document 22 also carries a time-stamp to indicate when it was last updated.

The top-level document 22 is inserted into a well-known location in the broadcast file system (eg Object Carousel). Well-known in this context means that either it is a publicly agreed location, or there is standardised method of signaling where it is located in the transport stream. The top-level document 22 is inserted into a "module" of the Object Carousel as determined by the specification of the Object Carousel. The receiver 12 can easily derive the module identity.

To identify updates, the receiver 12 listens for the module of the Object Carousel. The Object Carousel signals when a module is updated. Thus when the receiver 12 identifies that the module containing the top-level document 22 has been updated, it opens the module and examines the top-level document 22. The time stamp will confirm (or not) that the top-level document 22 contains a change. If there is a change, then the receiver 12 examines the top-level document 22 to find the time-stamps on each fragment identifier to find which fragments 20 have changed. The receiver 12 can then decide if this is a significant update or not.

Figure 2:
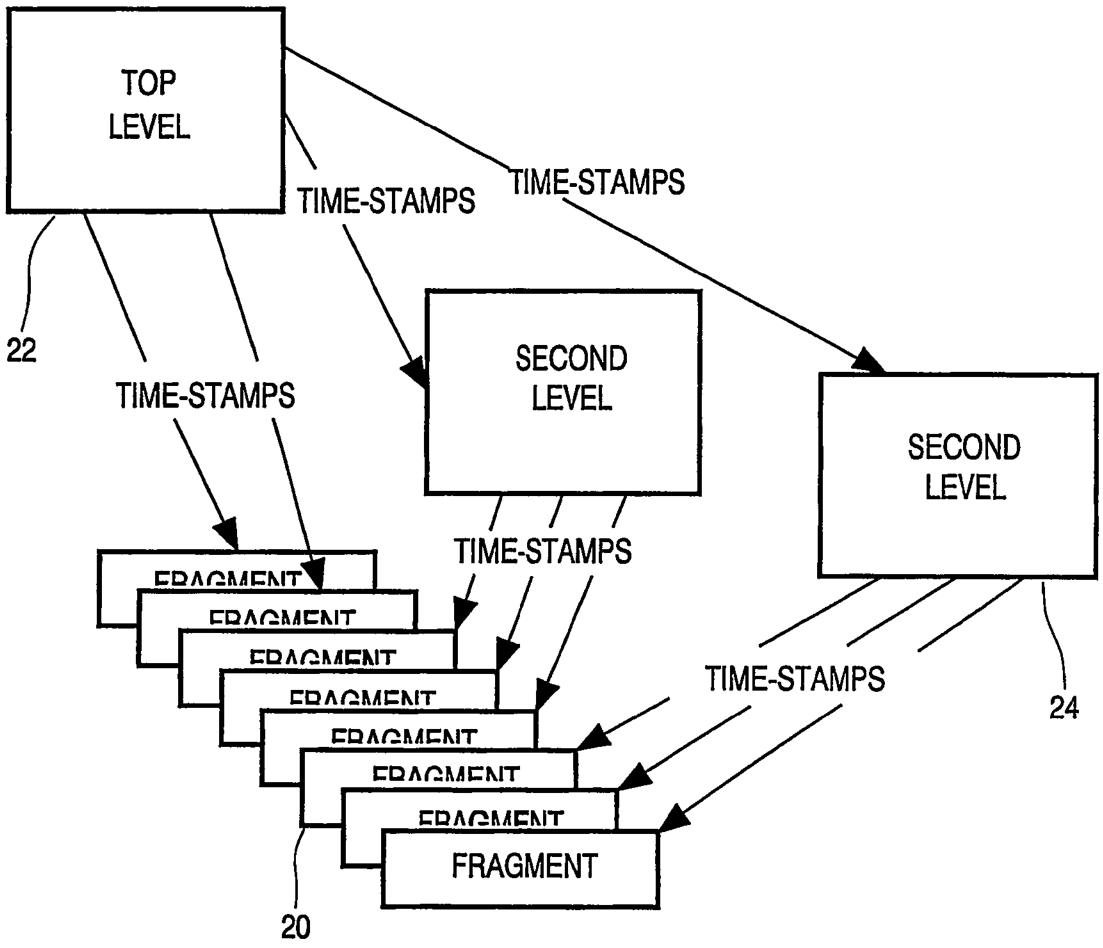
FIG. 2 is a schematic diagram of the relationship between data fragments and top and second level documents.

This system can be made more extensible by allowing both one top-level document 22 and multiple "second-level" documents 24 that have essentially the same functionality. FIG. 2 shows the relationship between the top-level document 22, second-level documents 24 and the data fragments 20. The top-level document 22 optionally refers to second-level documents 24. The reference is time-stamped for easy identification of changes. Both top-level 22 and second level documents 24 can refer to fragments 20. Thus time-stamps continue to make it relatively easy to identify where the changes are and if they are significant.

The document 22 that is acquired by the receiver 12 may be a specific file that is addressed, recalled and stored by the receiver 12, or it may be a portion of a larger index transmitted by the transmitter 10 as part of the data carousel 18. In the latter case the document 22 is extracted from the index to be read on demand by the receiver 12.

Such a system is particularly suitable to the DVB broadcast of TV Anytime metadata.

The invention claimed is:

1. A method of acquiring repetitively broadcast data, said broadcast data comprising broadcast data fragments and a top-level document, said method comprising:

acquiring by a receiver said broadcast data fragments;

acquiring the top-level document, which document comprises:

a document time-stamp indicating when said top-level document was last updated, and information on said fragments, said information including a time-stamp for each fragment of data, each time-stamp indicating when a respective fragment was last updated;

examining said information; and, re-acquiring said fragments according to said information.

2. A method according to claim 1, and further comprising reviewing the document time-stamp prior to said examining step.

3. Apparatus for acquiring repetitively broadcast data, said broadcast data comprising broadcast data fragments and a top-level document, said apparatus comprising:

receiving means for acquiring said broadcast data fragments and for acquiring the top-level document, which document comprises:

a document time-stamp indicating when said top-level document was last updated, and information on said fragments, said information including a time-stamp for each fragment of data, each time-stamp indicating when a respective fragment was last updated;

processing means for examining said information; and, wherein said receiving means re-acquires said fragments according to said information.

4. The apparatus according to claim 3, wherein said processor means reviews the document time-stamp prior to examining said information.

5. A method of repetitively broadcasting data, said broadcast data comprising broadcast data fragments and a top-level document, said method comprising:

broadcasting by a transmitter said data fragments, and broadcasting said top-level document, which document comprising:

a document time-stamp indicating when said top-level document was last updated, and information on said fragments, wherein said information includes a time-stamp for each fragment of data, each time-stamp indicating when a respective fragment was last updated.

6. A method according to claim 5, and further comprising updating said top-level document time-stamp whenever one or more of said fragments is updated.

7. Apparatus for repetitively broadcasting data, said broadcast data comprising broadcast data fragments and a top-level document, said apparatus comprising:

transmitting means for broadcasting said data fragments, and for broadcasting said top-level document, which document comprising:

a document time-stamp indicating when said top-level document was last updated, and information on said fragments, updating means for updating said fragments and for time-stamping when said updates occur for each respective updated fragment, wherein said information includes said time-stamp for each fragment of data, each time-stamp indicating when the respective fragment was last updated.

* * * * *